US012683163B2

(12) United States Patent
Sun et al.

(10) Patent No.: US 12,683,163 B2
(45) Date of Patent: Jul. 14, 2026

(54) PRELITHIATED NEGATIVE ELECTRODE, PREPARATION METHOD THEREOF, AND LITHIUM ION BATTERY AND SUPERCAPACITOR COMPRISING THE SAME

(71) Applicant: China Energy CAS Technology Co., Ltd., Tianjin (CN)

(72) Inventors: Zhaoyong Sun, Tianjin (CN); Chenghao Liu, Tianjin (CN); Qiang Chen, Tianjin (CN); Hanbo Mu, Tianjin (CN)

(73) Assignee: China Energy CAS Technology Co., Ltd., Tianjin (CN)

( * ) Notice: Subject to any disclaimer, the term of this patent is extended or adjusted under 35 U.S.C. 154(b) by 824 days.

(21) Appl. No.: 17/255,794

(22) PCT Filed: Mar. 30, 2020

(86) PCT No.: PCT/CN2020/082046
§ 371 (c)(1),
(2) Date: Dec. 23, 2020

(87) PCT Pub. No.: WO2021/195835
PCT Pub. Date: Oct. 7, 2021

(65) Prior Publication Data
US 2022/0052342 A1      Feb. 17, 2022

(51) Int. Cl.
H01M 4/587          (2010.01)
H01G 11/06          (2013.01)
(Continued)

(52) U.S. Cl.
CPC ............ H01M 4/587 (2013.01); H01G 11/06 (2013.01); H01G 11/38 (2013.01); H01G 11/86 (2013.01);
(Continued)

(58) Field of Classification Search
CPC .. H01M 4/587; H01M 4/0411; H01M 4/0416; H01G 11/06; H01G 11/38; H01G 11/86
See application file for complete search history.

(56) References Cited

U.S. PATENT DOCUMENTS

| | | | | |
|---|---|---|---|---|
| 7,295,423 B1 * | 11/2007 | Mitchell | .................. | H01G 9/00 361/502 |
| 2007/0026317 A1 * | 2/2007 | Mitchell | ................ | H01G 11/40 429/232 |

(Continued)

FOREIGN PATENT DOCUMENTS

| | | | |
|---|---|---|---|
| CN | 105374991 A | * | 3/2016 |
| CN | 106848312 A | | 6/2017 |

(Continued)

OTHER PUBLICATIONS

Machine translation of CN-108565125-A (Year: 2023).*

(Continued)

*Primary Examiner* — Nicholas P D'Aniello
*Assistant Examiner* — Albert Michael Hilton
(74) *Attorney, Agent, or Firm* — MagStone Law, LLP; Enshan Hong

(57)      ABSTRACT

The present disclosure provides a prelithiated negative electrode, a preparation method thereof, and a lithium ion battery and a supercapacitor comprising the same. The prelithiated negative electrode comprises: an electrode film which is a solvent-free film-like negative electrode material composed of a negative electrode active material, a lithium-skeleton carbon composite material, a binder and optionally a conductive additive; and a metal current collector, wherein the electrode film is bonded on the metal current collector through a conductive adhesive. The present disclosure provides an effective method of prelithiating a negative electrode, and can effectively improve the first cycle efficiency of a lithium battery comprising a silicon-carbon negative (Continued)

electrode, contributing to increasing the specific capacity and cycle life of the battery. The present disclosure can also increase the energy density of a supercapacitor.

8 Claims, 3 Drawing Sheets

(51) Int. Cl.

| | |
|---|---|
| *H01G 11/38* | (2013.01) |
| *H01G 11/86* | (2013.01) |
| *H01M 4/04* | (2006.01) |
| *H01M 4/62* | (2006.01) |
| *H01M 4/66* | (2006.01) |
| *H01M 10/0525* | (2010.01) |
| *H01M 4/02* | (2006.01) |

(52) U.S. Cl.

CPC ....... *H01M 4/0411* (2013.01); *H01M 4/0416* (2013.01); *H01M 4/0435* (2013.01); *H01M 4/623* (2013.01); *H01M 4/625* (2013.01); *H01M 4/661* (2013.01); *H01M 10/0525* (2013.01); *H01M 2004/027* (2013.01)

(56) References Cited

U.S. PATENT DOCUMENTS

| | | | | |
|---|---|---|---|---|
| 2011/0104571 | A1 | 5/2011 | Zhamu et al. | |
| 2013/0192750 | A1* | 8/2013 | Kiuchi | H01M 4/8814 |
| | | | | 156/247 |
| 2016/0049656 | A1* | 2/2016 | Laicer | H01M 4/0416 |
| | | | | 429/213 |
| 2016/0190597 | A1* | 6/2016 | Kim | H01M 4/386 |
| | | | | 252/182.1 |
| 2017/0117582 | A1* | 4/2017 | Mizuno | H01M 10/0525 |
| 2017/0214035 | A1* | 7/2017 | Xu | H01M 4/043 |

FOREIGN PATENT DOCUMENTS

| | | | | | |
|---|---|---|---|---|---|
| CN | 108346523 | A | | 7/2018 | |
| CN | 108565125 | A | * | 9/2018 | |
| CN | 109309194 | A | | 2/2019 | |
| CN | 105374991 | B | | 10/2019 | |
| EP | 3168849 | A1 | | 5/2017 | |
| WO | 2012099264 | A1 | | 7/2012 | |
| WO | WO-2019222110 | A1 | * | 11/2019 | ............. H01G 11/06 |

OTHER PUBLICATIONS

Ludwig, Brandon, et al. "Solvent-free manufacturing of electrodes for lithium-ion batteries." Scientific reports 6.1 (2016): 23150. (Year: 2016).*

ThermoFisher, "Safety Data Sheet," 2021 (Year: 2021).*

Cheng, Jigui, et al. "Fabrication and characterization of W-15Cu composite powders by a novel mechano-chemical process." Materials Science and Engineering: A 488.1-2 (2008): 453-457. (Year: 2008).*

Machine translation of CN-105374991-A (Year: 2025).*

Japanese Application No. 2020-573195, Notice of Reasons for Refusal mailed Jul. 13, 2022, 8 pages.

European Application No. 20827990.1, European Extended Search Report mailed Feb. 11, 2022, 11 pages.

Korean Application No. 10-2020-7037915, Notice of Reasons for Rejection mailed Jan. 16, 2022, 114 pages.

International Application No. PCT/CN2020/082046, International Search Report mailed Dec. 20, 2020, 4 pages.

* cited by examiner

PRELITHIATED NEGATIVE ELECTRODE, PREPARATION METHOD THEREOF, AND LITHIUM ION BATTERY AND SUPERCAPACITOR COMPRISING THE SAME

RELATED APPLICATIONS

This is a U.S. national stage of international application No. PCT/CN2020/082046 filed on Mar. 30 2020.

TECHNICAL FIELD

The present disclosure relates to the technical field of electrochemical energy storage, and particularly to a pre-lithiated negative electrode containing a lithium-carbon nanotube microsphere material and a preparation method thereof.

BACKGROUND

Lithium ion batteries have been widely used in portable electronics, electric vehicles, and power grid energy storage, due to their advantages of high energy density and good cycle stability. In current lithium ion batteries, graphite is typically used as a negative electrode material. The working principle is that lithium ions are extracted from/inserted between the positive electrode and negative electrode lay-ered active material layers. However, the graphite-based negative electrode material has a specific capacity limit of about 372 mAh/g. It is difficult to further increase the energy density of a lithium ion battery using such negative electrode material, and it can hardly meet the market requirement for lithium ion batteries with a higher energy density. To this end, there is a need to develop a negative electrode material with a higher specific capacity. The prelithiation of silicon-carbon materials becomes an effective route. Currently, commercial specific capacity of a silicon-carbon material can be up to 600 mAh/g or more, which is more than twice as much as that of a graphite electrode. As a result, the energy density of a battery can be effectively increased, meeting the commercial requirements. However, at present, the biggest problem limiting the commercial use of silicon-carbon is the low first cycle efficiency, which is only 80% or more, decaying severely. The use of prelithiation is an effective route to solve the problem of low first cycle efficiency.

Lithium ion supercapacitors have advantages of high power density, short charging/discharging time, long cycle life, wide operating temperature range, and so on. Therefore, they can be widely used in various application scenarios such as peak power assistance, emergency power supply, renewable energy storage, and alternative power supply, and have great application value and market potential in numer-ous fields such as industrial control, electric power, trans-portation, intelligent instrument, consumer electronics, national defence, communications and new energy vehicles. However, traditional supercapacitors are designed based on the double electric layer principle, and the energy density of the device as a whole is 5 to 8 wh/kg. This relatively low energy density results in high application cost of the device, failing to meet the requirements of the application client for the energy density. Lithium ion supercapacitor utilizes an electrolyte solution containing lithium ions to broaden the electrochemical window of the device. Also, in operation, the lithium ions react with active materials to provide a portion of energy. Therefore, lithium ion supercapacitor has a higher energy density, and also maintains advantages of high power density and long cycle life of the capacitor. In order to obtain a lithium ion supercapacitor with a higher energy density, and meanwhile since the effective ion con-centration in the electrolyte solution is decreased due to the consumption of lithium ions in the lithium ion supercapaci-tor during charging/discharging process, the electrode (i.e., the negative electrode) is required to be prelithiated.

Currently, for both traditional lithium ion batteries and supercapacitors, electrode sheets are prepared by a wet coating process. Prelithiation undergoes the development from an approach by spreading lithium powders onto the surface of an electrode sheet to an approach by laminating a lithium belt onto the surface of an electrode sheet for lithium supplement. After the prelithiation operation, it is required to perform an electrolyte solution immersion to make lithium ions diffuse into the interior of the electrode sheet, and this arises two problems. The first problem is that a relatively long time is needed. The second problem is that the diffusion is relatively non-uniform due to the presence of concentration gradient.

SUMMARY

A main object of the present disclosure is to provide a prelithiated negative electrode containing a lithium-carbon nanotube microsphere material and a preparation method thereof, which can effectively solve the defects in the above-mentioned methods.

In particular, in the present disclosure, the problems of low first cycle efficiency and low energy density of super-capacitors are solved through a dry process for electrode preparation by using a lithium-carbon nanotube microsphere material.

Embodiments of the present disclosure comprise the following technical solutions.

In some embodiments, provided is a prelithiated negative electrode, comprising:

an electrode film which is a solvent-free film-like negative electrode material composed of a negative electrode active material, lithium-skeleton carbon composite material par-ticles, a binder and optionally a conductive additive, wherein the lithium-skeleton carbon composite material particles are microparticles composed of a carbon-based porous micro-sphere material having pores with a pore size of 1 to 100 nm and metallic lithium present on the surface of and in the pores of the carbon-based porous microsphere material, and the microparticles have a particle size D50 of 5 to 20 µm, and wherein the lithium-skeleton carbon composite material particles has a content of 0.5% to 20% by mass based on the total mass of the electrode film, and is homogeneously dispersed in the entire electrode film; and a metal current collector, wherein the electrode film is bonded on the metal current collector through a conductive adhesive.

In some embodiments, provided is a method of preparing a prelithiated negative electrode, comprising: mixing and dispersing a negative electrode active material, particles of a lithium-skeleton carbon composite material, a binder and optionally a conductive additive with a high shear force under a solvent-free condition; extruding and calendering the obtained mixture into a film-like material with a thick-ness at a high temperature; and then bonding the obtained film-like material onto a current collector by pressure bond-ing.

In some embodiments, provided is a lithium ion battery or supercapacitor, comprising the prelithiated negative electrode as described above.

The present disclosure proposes a method of supplementing lithium by adding lithium-skeleton carbon composite material particles (such as a lithium-carbon nanotube microsphere material) and preparing an electrode sheet through a dry process. Because the dry powders are dispersed and mixed in advance to form homogeneously mixed powders, lithium is homogeneously distributed in the electrode sheet when performing the electrolyte solution immersion, thereby achieving a short diffusion time and a good homogeneity. The lithium-skeleton carbon composite material proposed herein also has marked advantages over traditional dry process for supplementing lithium to the electrode. Currently, the lithium source used in the dry process is a lithium bulk material or lithium powders (see Maxwell's patent application No. CN201880026159.7). When a lithium bulk material is used as the lithium source, the diffusion is difficult, the process operation is complex, the homogeneity is poor, and the process is not suitable for batch operation. When lithium powders are used as the lithium source, commercial lithium powders in the market have a D50 of 40 μm or more, which is much greater than the D50 of graphite (10 to 17 μm) and the D50 of silicon-carbon (10 to 20 μm). The electrode sheet formed has a thickness of only about 50 μm. As such, after the lithium supplement, the structure of the electrode sheet will be negatively affected. First, after the electrolyte solution immersion, lithium will convert into ion, and void defects will occur in the structure of the electrode sheet, which will influence the structure stability, ion conductivity and electron conductivity. Second, since the particles are relatively large, it is not beneficial for homogeneous dispersion. However, in the dry process for supplementing lithium by using the lithium-skeleton carbon composite material proposed herein, the particle diameter is relatively small (D50: 5 to 20 μm), which is beneficial for dispersing. After the prelithiation, lithium is extracted from the skeleton carbon (such as carbon nanotube microsphere), but the skeleton carbon structure remains, with no void in the structure. The skeleton carbon structure (such as carbon nanotube microsphere structure) can withstand a pressure of up to 20 MPa. Since the skeleton carbon itself is an excellent conductive additive, when lithium is extracted, remaining skeleton carbon can also serve as a portion of conductive additive, without waste in functionality.

Therefore, in the prelithiated negative electrode of the present disclosure, the lithium-skeleton carbon composite material can be homogeneously distributed in the negative electrode, which can effectively increase the first cycle life of a lithium ion battery, but also increase the energy density of a supercapacitor. The lithium-skeleton carbon composite material can also serve as a conductive additive for improving the conductivity of an electrode sheet.

DETAILED DESCRIPTION

Figure 1:
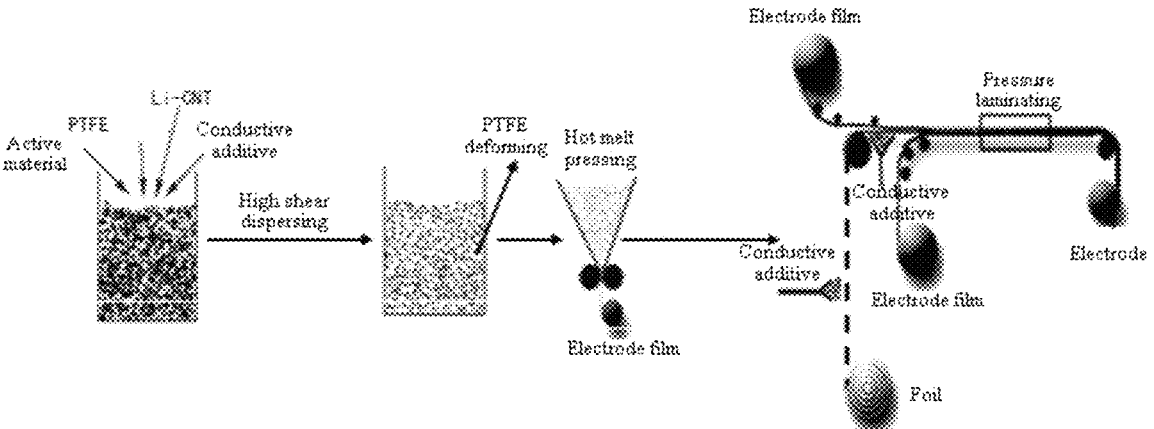
FIG. 1 is a process flow chart of a dry process for electrode preparation according to the present disclosure.

One aspect of the present disclosure provides a prelithiated negative electrode, comprising a lithium-skeleton carbon composite material, a binder and optionally a conductive additive, in addition to a negative electrode active material. These materials form a solvent-free film-like negative electrode material, i.e., an electrode film. The electrode film may have a thickness of 5 to 100 μm, and preferably 10 to 80 μm.

In some embodiments, the lithium-skeleton carbon composite material is a microparticle material composed of a carbon-based porous microsphere material having pores with a pore size of 1 to 100 nm and metallic lithium present on the surface of and in the pores of the carbon-based porous microsphere material, and the microparticle material has a particle size D50 of 5 to 20 μm.

In some embodiments, the lithium-skeleton carbon composite material has a content of 0.5% to 20%, such as, 3% to 20%, 5% to 20%, or 5% to 15%, by mass based on the total mass of the negative electrode material.

In some embodiments, the metallic lithium in the lithium-skeleton carbon composite material may have a content of 10% to 95%, 20% to 70%, 30% to 70%, or 40% to 70% by mass.

In some embodiments, the lithium-skeleton carbon composite material comprises at least one selected from the group consisting of a carbon nanofiber microsphere material, a carbon nanotube microsphere material and acetylene black, wherein the carbon nanofiber microsphere material or the carbon nanotube microsphere material are respectively formed by entangling and agglomerating carbon nanofibers or carbon nanotubes with each other, and the microsphere is full of carbon nanofibers or carbon nanotubes in its interior (to form a nearly solid structure rather than a hollow structure), with a large number of nanoscale pores being present in its interior and on its surface.

In some embodiments, the carbon nanotube microspheres are spherical or spheroidal particles. The particles may have an average diameter of 1 μm to 100 μm, and preferably 1 μm to 25 μm, and a specific surface area of 100 to 1500 m²/g, and preferably 150 to 500 m²/g. The pores contained in the microspheres may have a pore size distribution of 1 to 100 nm, and preferably 1 to 50 nm.

In some embodiments, the carbon nanotube microspheres at least have any one selected from the group consisting of a microspherical entities agglomeration structure, a spherical agglomeration structure, a spheroidal agglomeration structure, a porous spherical agglomeration structure, and a donut-shaped agglomeration structure.

In some embodiments, the carbon nanotube or carbon nanofiber microspheres may be prepared by dispersing carbon nanotubes or carbon nanofibers in a solvent to form a dispersion, and then spray drying the dispersion.

For example, the preparation method may comprise the steps of:

A. dispersing carbon nanotubes or carbon nanofibers in a dispersion solvent (surfactant-free) through a sonication treatment to obtain a dispersion;

B. spraying the dispersion obtained in step A out through a nozzle of a spray dryer, at a preset air inlet temperature and a preset air outlet temperature, wherein the dispersion is kept under stirring during spraying; and C. cooling the sprayed dispersion to obtain the carbon nanotube microspheres or carbon nanofiber microspheres.

In some embodiments, as the solvent, an organic and/or inorganic liquid capable of dispersing the carbon nanotubes/carbon nanofibers homogeneously may be used, for example, any one selected from the group consisting of water, aqueous ammonia, hydrochloric acid solution, ethanol, acetone, and isopropanol, or a combination thereof.

In some embodiments, the solvent may be a mixture of ethanol and water in a volume ratio of 1:10.

In some embodiments, the conditions for the spray drying may comprise: an air inlet temperature of 150 to 250° C., and an air outlet temperature of 75° C. or more, such as 75 to 150° C., or 90° C. or more. One preferred condition for the spray drying comprises: an air inlet temperature of 190 to 210° C. and an air outlet temperature of 90 to 110° C.

In some embodiments, the spray speed of the spray drying may be 1 mL/min to 100 L/min.

In some embodiments, the lithium-skeleton carbon composite material may be obtained by mixing molten metallic lithium with a carbon-based porous microsphere material (i.e., a porous skeleton carbon material) and cooling the mixture. The mixing may comprise stirring and mixing the metallic lithium and the porous skeleton carbon material under heating (for example, at about 200° C.), or immersing the porous skeleton carbon material in molten metallic lithium. The metallic lithium-skeleton carbon composite material is prepared under an inert atmosphere, for example, in a glove box under an argon atmosphere (with a moisture content of <10 ppm and an oxygen content of <10 ppm).

In some embodiments, the negative electrode active material comprises a negative electrode material for lithium battery or a negative electrode material for supercapacitor. Here, the negative electrode material for lithium battery is selected from at least one of a silicon-carbon composite material, graphite and lithium titanate; and the negative electrode material for supercapacitor is selected from at least one of graphite, hard carbon and soft carbon.

In some embodiments, the binder comprises a polyolefin-based material such as carboxymethyl cellulose (CMC), poly(acrylic acid), poly(vinylidene fluoride) (PVDF), and polytetrafluoroethylene (PTFE); or poly(methyl methacrylate) (PMMA) and poly(ethylene oxide) (PEO). Preferably, the binder in the electrode film has a content of 1% to 5% by mass.

In some embodiments, the negative electrode material may or may not comprise a conductive additive, wherein the conductive additive is at least one of carbon black (such as acetylene black and Super P), carbon nanofibers, carbon nanotubes, and graphene.

In some embodiments, the electrode sheet of the prelithiated negative electrode further comprises a metal current collector, on which the negative electrode material is supported.

In some embodiments, the metal current collector comprises a copper foil. The copper foil may have a thickness of about 10 μm (+/−μm).

In some embodiments, the negative electrode material is bonded on the metal current collector through a conductive adhesive. The conductive adhesive comprises at least one selected from the group consisting of an epoxy resin conductive adhesive, a phenolic resin conductive adhesive, a polyurethane conductive adhesive, a thermoplastic resin conductive adhesive, and a polyimide conductive adhesive.

Another aspect of the present disclosure provides a method of preparing a prelithiated negative electrode for lithium ion battery, comprising: dispersing a mixture of a negative electrode active material (such as a silicon-carbon composite material), a lithium-skeleton carbon composite material, a binder and optionally a conductive additive at high speed, extruding the mixture at high temperature to form a film, and pressure laminating the film on a current collector to form an negative electrode sheet.

Another aspect of the present disclosure provides a method of preparing a prelithiated negative electrode for supercapacitor, comprising: dispersing a mixture of a supercapacitor negative electrode material (such as an activated carbon material), a lithium-skeleton carbon composite material, a binder and optionally a conductive additive at high speed, extruding the mixture at high temperature to form a film, and pressure laminating the film on a current collector to form an negative electrode sheet.

With reference to FIG. 1, a process flow chart of preparing an electrode according to the present disclosure is described, wherein a lithium-skeleton carbon composite material is a metallic lithium-carbon nanotube skeleton composite material (Li-CNT), and the binder is polytetrafluoroethylene (PTFE), for example.

First, dry materials (comprising a negative electrode active material, Li-CNT, a binder of PTFE and a conductive additive) are high shear dispersed (at a linear shear rate of more than 10/m/mim) in the absence of solvent. The PTFE deforms under high shear. This step of mixing and dispersing may be performed through a jet milling process, for example, using a high pressure gas (such as high pressure air). The high pressure gas may have a dew point of −40 to −60° F., a moisture content less than 15 ppm, and a pressure of 60 to 100 PSI.

Then, the resulting mixture is hot melt pressed at a high temperature (50 to 350° C., preferably 180 to 350° C., and more preferably 210 to 300° C.) and extrusion calendered to form an electrode film with a thickness. The thickness of the calendering molded electrode film may be 5 to 100 μm.

Finally, the electrode film obtained is pressure laminated with a current collector foil to form a (prelithiated) negative electrode. The electrode film may be laminated on one side or both sides of the current collector foil. They are bonded with each other through a conductive adhesive. At least one pressure roll in the pressure lamination utilizes a heating treatment, and the pressure for rolling ranges from 0.1 to 120 MPa, and preferably 50 to 100 MPa.

In order to make the objects, technical solutions and advantages of the present disclosure more clear and apparent, the present disclosure will be further described in detail below with reference to examples and comparative examples. It should be appreciated that the particular examples described here are only intended to explain, but not to limit the present disclosure. In addition, technical features involved in various examples of the present disclosure described below can be combined with each other, as long as they do not conflict with each other.

Moreover, various product structure parameters, various reactants and process conditions used in the following examples are typical instances. However, the inventors have verified through a large number of experiments that other structure parameters, other types of reactants and other process conditions different from those listed above are also applicable, and can also achieve the technical effects as stated in the present disclosure.

Synthesis Example 1

2 g of multi-walled carbon nanotubes (Dazhan Nanomaterial Co., Ltd., Shandong) were added into a mixed solvent of 200 mL deionized water and 20 mL ethanol, and treated with a 130 W ultrasonic probe for 5 hours, such that the carbon nanotubes were homogeneously dispersed in the solvent. Subsequently, the sample was added into a spray dryer (Model YC-015, Yacheng Instrument and Equipment Co., Ltd, Shanghai), with parameters set as follows: air inlet temperature 200° C., air outlet temperature: 150° C., spray pressure: 40 MPa, and sample amount: 500 mL/h. The product obtained after spray drying was carbon nanotube microspheres.

In a glove box full of argon (with moisture content and oxygen content not higher than 3 ppm), 10 g of battery-grade metallic lithium (China Energy Lithium Co., Ltd, Tianjin) and 5 g of carbon nanotube microspheres were added into a heater equipped with a stainless steel reactor, heated to 200° C., stirred at a stirring rate of 100 rpm for 1 minute, then heated to 230° C., stirred at a stirring rate of 500 rpm for 20 minutes, and cooled to room temperature, to obtain a product of metallic lithium-skeleton carbon composite material (D50: 18.2 μm, lithium content: 66%).

Synthesis Example 2

Preparation of a positive electrode for supercapacitor: materials were weighed as follows: poly(vinylidene fluoride) (Solvay 5130): acetylene black (Hexing Chemical Industry Co., Ltd., Jiaozuo): activated carbon material (Kuraray): water=40 mg: 40 mg: 1500 mg: 20 ml, placed in a glass bottle, and stirred overnight (for more than 10 hours). Here, poly(vinylidene fluoride) (Sigma-Aldrich) was used as a binder, acetylene black was used as a conductive additive, activated carbon (Kuraray, Japan) was used as an active material, and water was used as a solvent. The uniformly stirred slurry was applied on an aluminum foil, with a doctor blade thickness of 250 μm and an aluminum foil thickness of 15 μm. The electrode sheet was oven dried at 60° C. under vacuum (−0.1 MPa) overnight. Then, the oven dried electrode sheet was cut to a dimension of 56 mm*43 mm and used as the positive electrode sheet for supercapacitor.

Synthesis Example 3

Preparation of a positive electrode for lithium cobalt oxide battery: materials were weighed as follows: poly (vinylidene fluoride): acetylene black: lithium cobalt oxide material (Tianjin B&M Science and Technology Co., Ltd.): NMP=30 mg: 30 mg: 1000 mg: 12 ml, placed in a glass bottle, and stirred for 6 hours. Here, poly(vinylidene fluoride) (Sigma-Aldrich) was used as a binder, acetylene black was used as a conductive additive, lithium cobalt oxide was used as an active material, and NMP was used as a solvent. The uniformly stirred slurry was applied on a copper foil, with a doctor blade thickness of 250 μm and a copper foil thickness of 10 μm. The electrode sheet was oven dried at 60° C. under vacuum (−0.1 MPa) overnight. Then, the oven dried electrode sheet was cut to a dimension of 56 mm*43 mm and used as the positive electrode sheet for lithium cobalt oxide battery.

Example 1

Materials were weighed as follows: polytetrafluoroethylene: acetylene black: silicon-carbon (Shanshan Science and Technology Co., Ltd., Shanghai): metallic lithium-skeleton carbon composite material (obtained from Synthesis Example 1)=4 g: 4 g: 200 g: 24 g, placed in a small size jet mill (Smsie Instrument and Equipment Co., Ltd., Beijing), and ground for 2 hours. Here, polytetrafluoroethylene was used as a binder, acetylene black was used as a conductive additive, silicon-carbon was used as an active material, and lithium-carbon nanotube was used as a material for prelithiation. The uniformly dispersed material was high temperature extruded to form an electrode film with a thickness of 90 μm. Then, the electrode film was pressure laminated on a copper foil current collector with a thickness of 10 μm by using a roller press. Then, the electrode sheet obtained was cut to a dimension of 58 mm*45 mm, and used as the negative electrode sheet for prelithiated lithium ion battery. The electrode sheet obtained was punched into an electrode sheet with a diameter of 15.6 cm, which was used as a prelithiated lithium ion half-cell. The above procedure was performed in a glove box full of argon (with a moisture content ≤3 ppm, and an oxygen content ≤3 ppm).

The above silicon-carbon electrode was assembled with a lithium sheet to form a half cell, on which electrochemical test was performed with a button battery tester.

Comparative Example 1

Materials were weighed as follows: polytetrafluoroethylene: acetylene black: silicon-carbon (Shanshan Science and Technology Co., Ltd., Shanghai)=4 g: 10 g: 200 g, placed in a small size jet mill (Smsie Instrument and Equipment Co., Ltd., Beijing), and ground for 2 hours. Here, polytetrafluoroethylene was used as a binder, acetylene black was used as a conductive additive, and silicon-carbon was used as an active material. The uniformly dispersed material was high temperature extruded to form an electrode film with a thickness of 90 μm. Then, the electrode film was pressure laminated on a copper foil current collector with a thickness of 10 μm by using a roller press. Then, the electrode sheet obtained was cut to a dimension of 58 mm*45 mm, and used as the negative electrode sheet for un-prelithiated lithium ion battery. The electrode sheet obtained was punched into an electrode sheet with a diameter of 15.6 cm, which was used as an un-prelithiated lithium ion half-cell. The above procedure was performed in a glove box full of argon (with a moisture content ≤3 ppm, and an oxygen content ≤3 ppm).

The above silicon-carbon electrode was assembled with a lithium sheet to form a half cell, on which electrochemical test was performed with a button battery tester.

Figure 2:
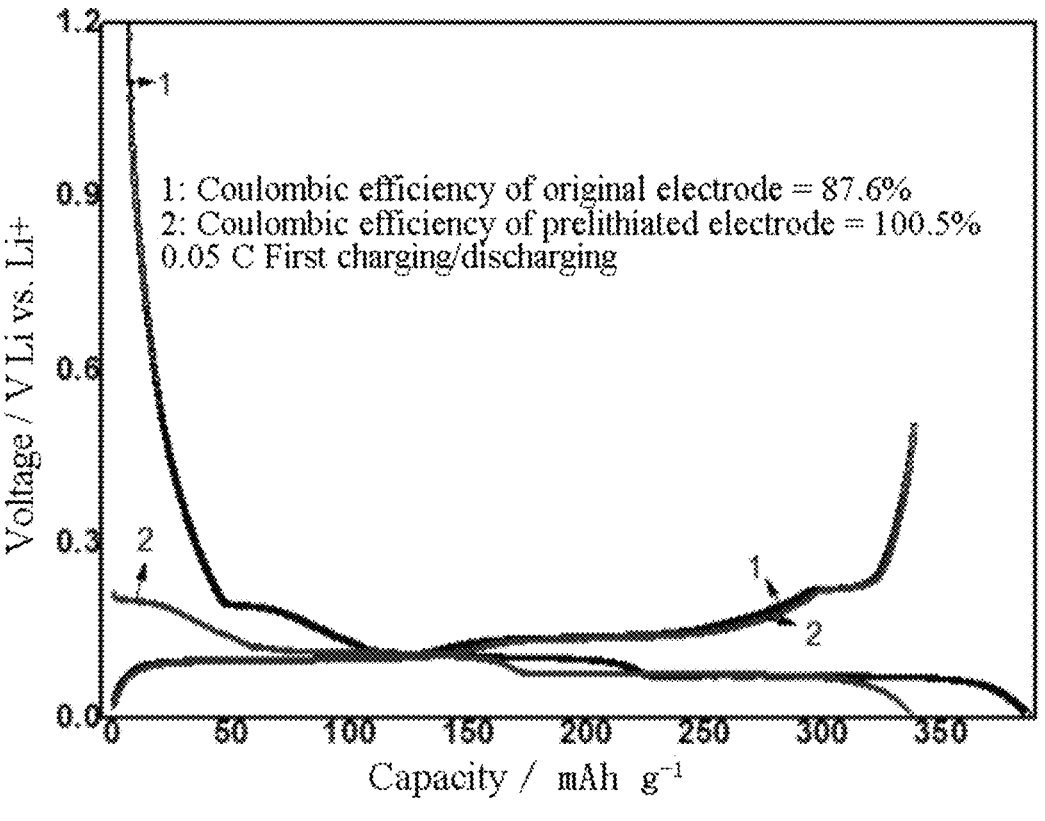
FIG. 2 shows the discharging data for the silicon-carbon electrodes in Example 1 and Comparative Example 1 before and after prelithiation.

FIG. 2 shows the first charging/discharging curve for the silicon-carbon electrode before and after prelithiation (with lithium electrode as the counter electrode). As seen from FIG. 2, at a rate of 0.05 C, the silicon-carbon electrode only has a first cycle efficiency of 87.6% before prelithiation, and the first cycle efficiency can be up to 100.5% after prelithiation, indicating a significant effect of improving the first cycle efficiency.

Example 2

The positive electrode sheet (obtained from Synthesis Example 3), a separator, and the negative electrode sheet (obtained from Example 1) were laminated together in sequence, with an aluminum foil as the external packing housing, supplemented with an electrolyte solution, and packed to obtain a prelithiated supercapacitor cell. Here, the electrolyte solution was a 1 mol/L solution of $LiPF_6$ in EC/DMC/DEC (Vol 1/1/1, Shanshan Battery Material Co., Ltd., Dongguan), and the separator was a PP separator (Celgard 3105, Atop New Materials Co., Ltd., Shenzhen). The first charging/discharging test and the charging/discharging cycle test were performed on the prepared prelithiated lithium cobalt oxide battery with a pouch cell tester.

Comparative Example 2

The positive electrode sheet (obtained from Synthesis Example 3), a separator, and the negative electrode sheet (obtained from Comparative Example 1) were laminated together in sequence, with an aluminum foil as the external packing housing, supplemented with an electrolyte solution, and packed to obtain an un-prelithiated supercapacitor cell. Here, the electrolyte solution was a 1 mol/L solution of $LiPF_6$ in EC/DMC/DEC (Vol 1/1/1, Shanshan Battery Material Co., Ltd., Dongguan), and the separator was a PP separator (Celgard 3105, Atop New Materials Co., Ltd., Shenzhen). A first charging/discharging test and a charging/discharging cycle test were performed on the prepared un-prelithiated lithium cobalt oxide battery with a pouch cell tester.

Figure 3:
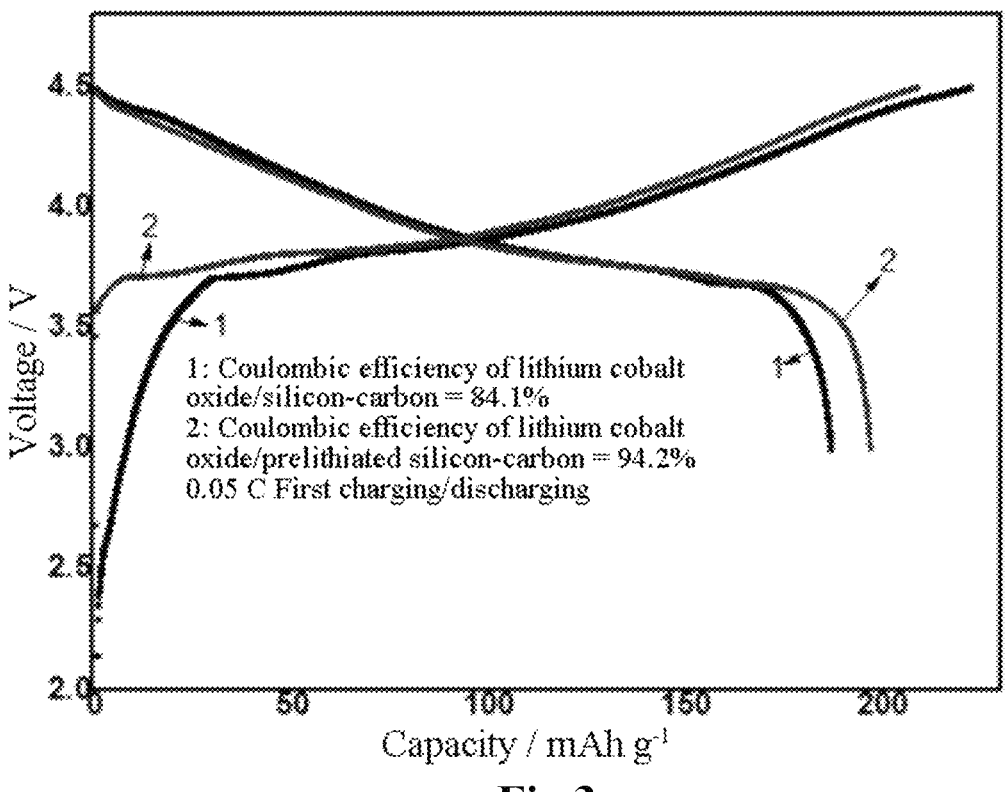
FIG. 3 shows the discharging data for the silicon-carbon electrode full cells in Example 2 and Comparative Example 2 before and after prelithiation.

FIG. 3 shows the first charging/discharging curve for the full cell composed of the silicon-carbon electrode before and after prelithiation and lithium cobalt oxide. As seen from FIG. 3, at a rate of 0.05 C, the silicon-carbon electrode only has a first cycle efficiency of 84.1% before prelithiation, and the first cycle efficiency can be up to 94.2% after prelithiation, indicating a significant effect of improving the first cycle efficiency.

Figure 4:
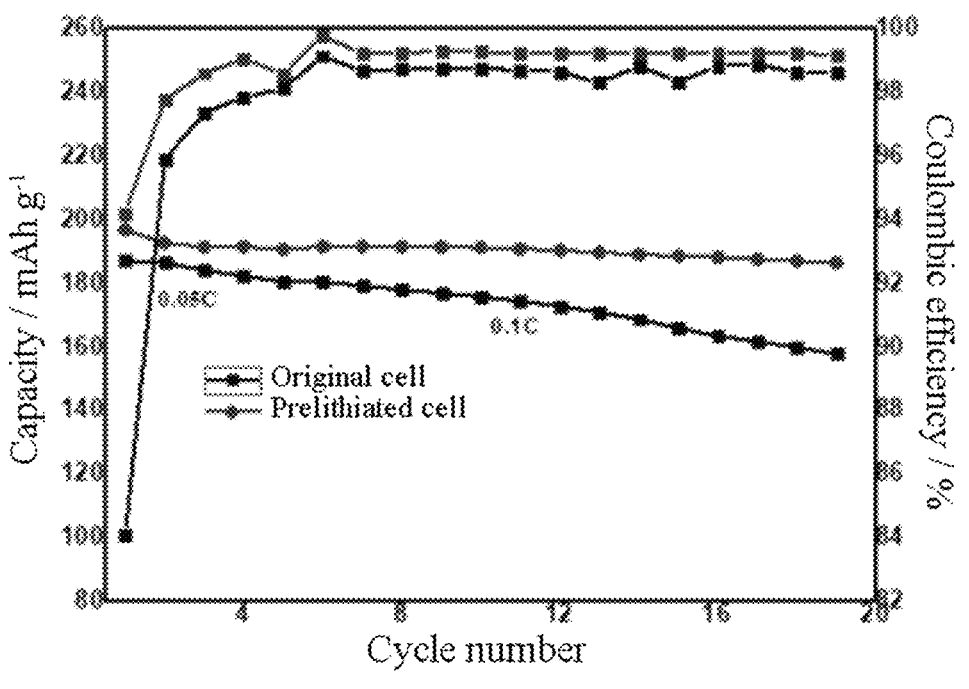
FIG. 4 shows the cycling discharging data for the silicon-carbon electrode full cells in Example 2 and Comparative Example 2 before and after prelithiation.

FIG. 4 shows the cycling charging/discharging curve for the full cell composed of the silicon-carbon electrode before and after prelithiation and lithium cobalt oxide. As seen from FIG. 4, at a rate of 0.05 C, the silicon-carbon electrode has a significantly improved first cycle efficiency after prelithiation, and at a rate of 0.1 C, the capacity per gram is increased from 178 mAh/g to 192 mAh/g, and the capacity retention after cycling is also significantly improved.

Example 3

Materials were weighed as follows: polytetrafluoroethylene: acetylene black: activated carbon (Kuraray): metallic lithium-skeleton carbon composite material (obtained from Synthesis Example 1)=4 g: 4 g: 150 g: 20 g, placed in a small size jet mill (Smsie Instrument and Equipment Co., Ltd., Beijing), and ground for 2 hours. Here, polytetrafluoroethylene was used as a binder, acetylene black was used as a conductive additive, activated carbon was used as an active material, and lithium-carbon nanotube was used as a material for prelithiation. The uniformly dispersed material was high temperature extruded to form an electrode film with a thickness of 100 μm. Then, the electrode film was pressure laminated on an aluminum foil current collector with a thickness of 15 μm by using a roller press. Then, the electrode sheet obtained was cut to a dimension of 58 mm*45 mm, and used as the negative electrode sheet for prelithiated lithium supercapacitor. The above procedure was performed in a glove box full of argon (with a moisture content ≤3 ppm, and an oxygen content ≤3 ppm).

The positive electrode sheet (obtained from Synthesis Example 2), a separator, and the above negative electrode sheet were laminated together in sequence, with an aluminum foil as the external packing housing, supplemented with an electrolyte solution, and packed to obtain a prelithiated supercapacitor cell. Here, the electrolyte solution was a 1 mol/L solution of $LiPF_6$ in EC/DMC/DEC (Vol 1/1/1, Shanshan Battery Material Co., Ltd., Dongguan), and the separator was a PP separator (Celgard 3105, Atop New Materials Co., Ltd., Shenzhen). A charging/discharging cycling test was performed on the prepared prelithiated supercapacitor with a supercapacitor tester.

Comparative Example 3

Materials were weighed as follows: polytetrafluoroethylene: acetylene black: activated carbon (Kuraray)=4 g: 6 g: 150 g, placed in a small size jet mill (Smsie Instrument and Equipment Co., Ltd., Beijing), and ground for 2 hours. Here, polytetrafluoroethylene was used as a binder, acetylene black was used as a conductive additive, and activated carbon was used as an active material. The uniformly dispersed material was high temperature extruded to form an electrode film with a thickness of 100 μm. Then, the electrode film was pressure laminated on an aluminum foil current collector with a thickness of 15 μm by using a roller press. Then, the electrode sheet obtained was cut to a dimension of 58 mm*45 mm, and used as the negative electrode sheet for un-prelithiated lithium supercapacitor. The above procedure was performed in a glove box full of argon (with a moisture content ≤3 ppm, and an oxygen content ≤3 ppm).

The positive electrode sheet (obtained from Synthesis Example 2), a separator, and the negative electrode sheet were laminated together in sequence, with an aluminum foil as the external packing housing, supplemented with an electrolyte solution, and packed to obtain a un-prelithiated supercapacitor cell. Here, the electrolyte solution was a 1 mol/L solution of $LiPF_6$ in EC/DMC/DEC (Vol 1/1/1, Shanshan Battery Material Co., Ltd., Dongguan), and the separator was a PP separator (Celgard 3105, Atop New Materials Co., Ltd., Shenzhen). A charging/discharging cycling test was performed on the prepared un-prelithiated supercapacitor with a supercapacitor tester.

Figure 5:
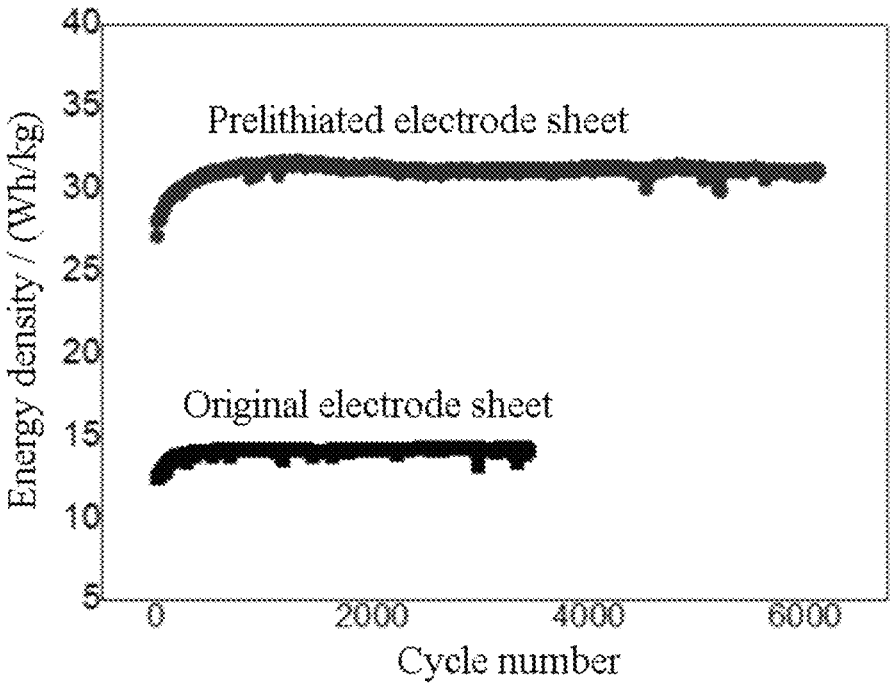
FIG. 5 shows the cycling discharging data for the supercapacitors in Example 3 and Comparative Example 3 before and after prelithiation.

FIG. 5 shows the charging/discharging data for the supercapacitor before and after prelithiation. As seen from FIG. 5, after prelithiation, the cycle life of the supercapacitor is increased from 3,500 cycles to 6,200 cycles, and the energy density of the supercapacitor is increased from 13 Wh/kg to 32 Wh/kg. Both the cycle life and the energy density are greatly improved.

Comparative Example 4

Materials were weighed as follows: polytetrafluoroethylene: acetylene black: activated carbon (Kuraray): metallic lithium-skeleton carbon composite material (obtained from Synthesis Example 1): water=40 mg: 10 mg: 1500 mg: 10 mg: 20 ml, placed in a glass bottle, and stirred overnight (for more than 10 hours). Here, poly(vinylidene fluoride) (Sigma-Aldrich) was used as a binder, acetylene black was used as a conductive additive, activated carbon (Kuraray, Japan) was used as an active material, water was used as a solvent, and metallic lithium-skeleton carbon composite material was used as a material for supplementing lithium. The uniformly stirred slurry was applied on an aluminum foil, with a doctor blade thickness of 250 μm and an aluminum foil thickness of 10 μm. The electrode sheet was oven dried at 60° C. under vacuum (−0.1 MPa) overnight. Then, the oven dried electrode sheet was cut to a dimension of 56 mm*43 mm and used as the wet process prelithiated negative electrode sheet for supercapacitor. The above procedure was performed in a glove box full of argon (with a moisture content ≤3 ppm, and an oxygen content ≤3 ppm).

The positive electrode sheet (obtained from Synthesis Example 2), a separator, and the above negative electrode sheet were laminated together in sequence, with an aluminum foil as the external packing housing, supplemented with an electrolyte solution, and packed to obtain a wet process prelithiated supercapacitor cell. Here, the electrolyte solution was a 1 mol/L solution of $LiPF_6$ in EC/DMC/DEC (Vol 1/1/1, Shanshan Battery Material Co., Ltd., Dongguan), and the separator was a PP separator (Celgard 3105, Atop New Materials Co., Ltd., Shenzhen). A charging/discharging cycling test was performed on the prepared wet process prelithiated supercapacitor with a supercapacitor tester.

Figure 6:
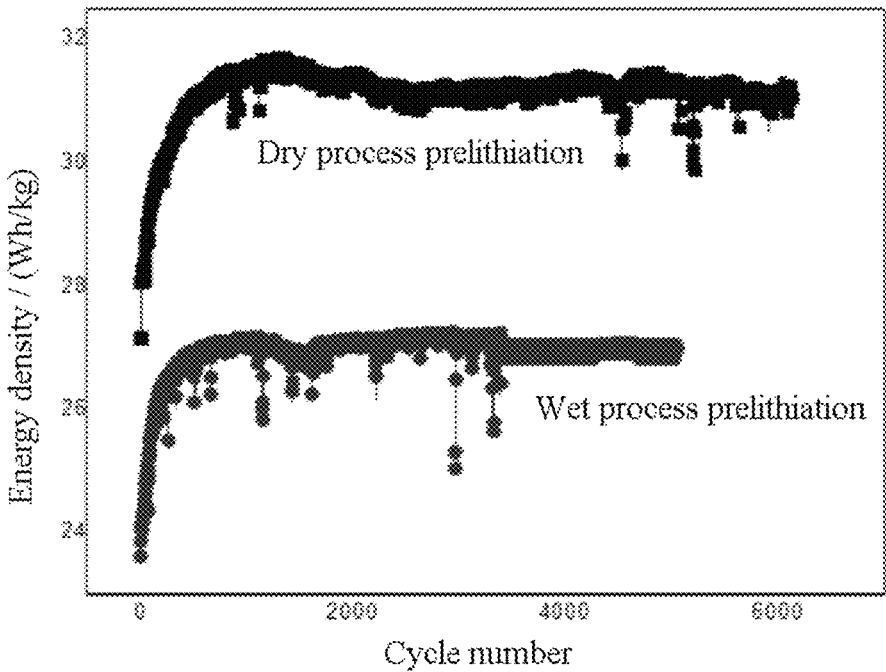
FIG. 6 shows the cycling discharging data for the supercapacitors before and after dry prelithiation process and wet prelithiation process.

FIG. 6 shows the charging/discharging data for the supercapacitor prepared by a dry process and the supercapacitor prepared by a wet process before and after prelithiation. As seen from FIG. 6, after the dry process prelithiation, the cycle life of the supercapacitor is increased from 5,054 cycles (using the wet process) to 6,200 cycles, and the energy density of the supercapacitor is increased from 27 Wh/kg to 32 Wh/kg, indicating higher energy density and longer cycle life of the electrode sheet prepared by the dry process. This is related to the homogeneous dispersion of the active material and the conductive additive and the high compact density for the electrode sheet prepared by the dry process It should be appreciated that the above embodiments are only some preferred embodiments of the present disclosure, but not intended to limit the present application. Any variations, equivalents, modifications and the like made within the spirit and principle of the present application should be included within the protection scope of the present application.

The invention claimed is:

1. A method of preparing a prelithiated negative electrode wherein the method comprises:

mixing and dispersing a negative electrode active material, particles of a lithium-skeleton carbon composite material, a binder and a conductive additive with a high shear force under a solvent-free condition, wherein the mixing and dispersing is performed through a jet milling process, wherein a high pressure gas used in the jet milling has a dew point of −40° F. to −60° F., a moisture content of less than 15 ppm, and a pressure of 60 to 100 PSI;

extruding and calendering the obtained mixture at a high temperature of 180 to 350° C. into an independent film-like material with a thickness; and pressure bonding the obtained film-like material onto a current collector, wherein the negative electrode active material is a negative electrode material for lithium battery, selected from at least one of a silicon-carbon composite material and lithium titanate, wherein the lithium-skeleton carbon composite material is a microparticle material composed of a carbon-based porous microsphere material having pores with a pore size of 1 to 100 nm and metallic lithium present on the surface of and in the pores of the carbon-based porous microsphere material, and the microparticle material has a particle size D50 of 5 to 20 μm, wherein the carbon-based porous microsphere material comprises at least one selected from the group consisting of a carbon nanofiber microsphere material and a carbon nanotube microsphere material, wherein the carbon nanofiber microsphere material or the carbon nanotube microsphere material are respectively formed by entangling and agglomerating carbon nanofibers or carbon nanotubes with each other, and the microsphere is full of carbon nanofibers or carbon nanotubes in its interior, with nanoscale pores being present in its interior and on its surface, and wherein the binder comprises at least one of carboxymethyl cellulose (CMC);

poly(acrylic acid);

polytetrafluoroethylene (PTFE);

poly(methyl methacrylate) (PMMA); and poly(ethylene oxide) (PEO).

2. The method according to claim 1, wherein a rolling pressure of the pressure bonding ranges from 0.1 to 120 MPa.

3. The method according to claim 2, wherein the rolling pressure of the pressure bonding ranges from 50 to 100 MPa.

4. The method according to claim 1, wherein the high temperature is 210 to 300° C.

5. The method of preparing a prelithiated negative electrode according to claim 1, wherein the metallic lithium in particles of the lithium-skeleton carbon composite material has a content of 10% to 95% by mass.

6. The method of preparing a prelithiated negative electrode according to claim 1, wherein the binder has a content of 1% to 5% by mass.

7. The method of preparing a prelithiated negative electrode according to claim 1, wherein the conductive additive is selected from the group consisting of carbon black, carbon nanofibers, carbon nanotubes, graphene, and combinations thereof.

8. The method of preparing a prelithiated negative electrode according to claim 1, wherein the independent film-like material is bonded on the current collector through a conductive adhesive, and the conductive adhesive comprises at least one selected from the group consisting of an epoxy resin conductive adhesive, a phenolic resin conductive adhesive, a polyurethane conductive adhesive, a thermoplastic conductive adhesive, and a polyimide conductive adhesive.

* * * * *